(12) United States Patent
Innis

(10) Patent No.: US 6,349,823 B1
(45) Date of Patent: Feb. 26, 2002

(54) PROMOTIONAL MEDIA CARRIER

(76) Inventor: John Innis, 1193 N. Lancaster Cir., South Elgin, IL (US) 60177

( * ) Notice: Subject to any disclaimer, the term of this patent is extended or adjusted under 35 U.S.C. 154(b) by 0 days.

(21) Appl. No.: 09/800,066

(22) Filed: Mar. 6, 2001

(51) Int. Cl.[7] .............................................. B65D 85/57
(52) U.S. Cl. .................................... 206/308.1; 206/484
(58) Field of Search ............................ 206/308.1, 309, 206/310, 311, 312, 484, 493, 303

(56) References Cited

U.S. PATENT DOCUMENTS

| | | | | |
|---|---|---|---|---|
| 2,306,726 A | * | 12/1942 | Hasin | 206/303 |
| 2,690,253 A | * | 9/1954 | Francois | 206/303 |
| 2,850,158 A | * | 9/1958 | Woodward | 206/303 |
| 3,163,288 A | * | 12/1964 | Arvidsson | 206/63.3 |
| 3,199,768 A | * | 8/1965 | Farmlett | 206/308.1 |
| 4,879,710 A | * | 11/1989 | Iijima | 206/308.1 |
| 5,620,271 A | * | 4/1997 | Bergh et al. | 206/308.1 |
| 5,732,818 A | | 3/1998 | Koehn | |
| 6,016,908 A | | 1/2000 | Gaetano | |

* cited by examiner

Primary Examiner—Shian Luong
(74) Attorney, Agent, or Firm—Thomas R. Vigil

(57) ABSTRACT

The package or carrier for a compact disc comprises: a lower layer of flexible plastic material, a compact disc positioned on the lower layer and an upper layer sealed in two concentric circles to the lower layer, the inner circular seal surrounding a circular hole through the two layers and the outer circular seal extending in a circle around the periphery of the compact disc.

27 Claims, 1 Drawing Sheet

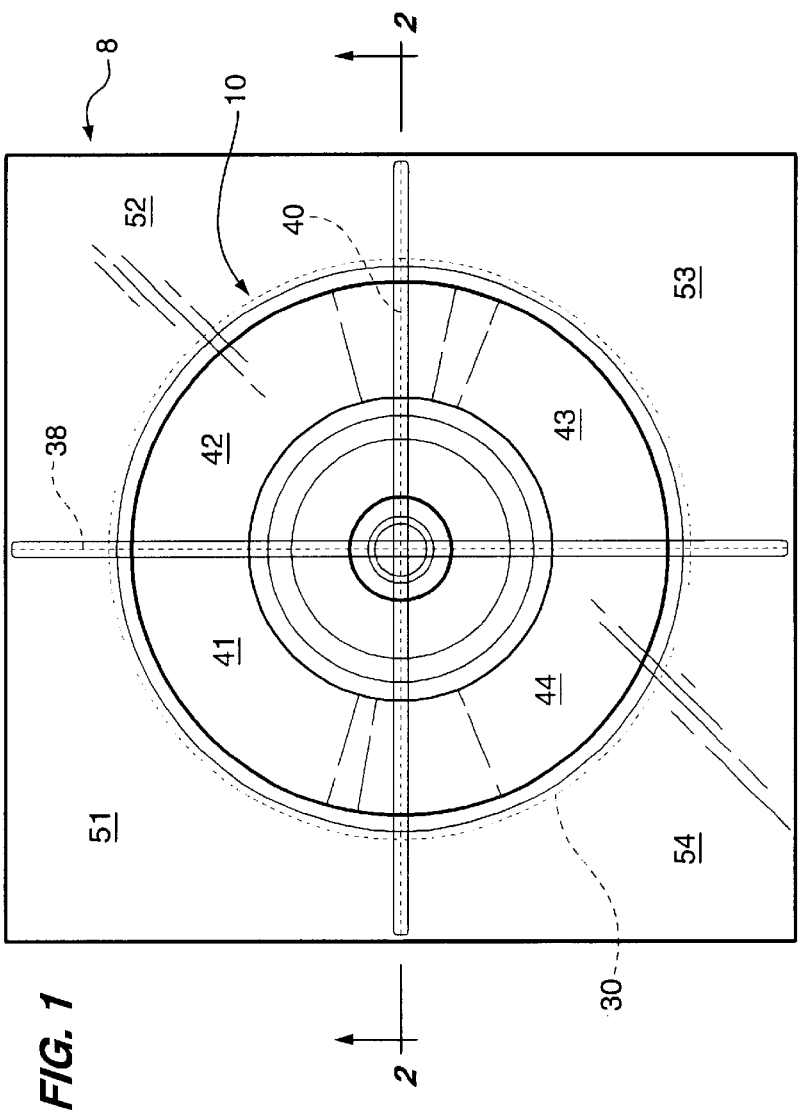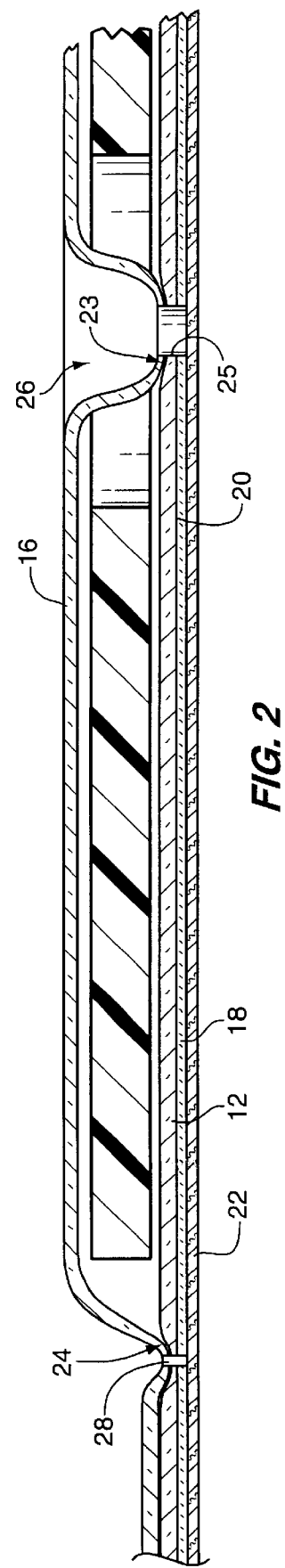

PROMOTIONAL MEDIA CARRIER

BACKGROUND OF THE INVENTION

1. Field of the Invention

The present invention relates to a carrier or a package for a compact disc having promotional media thereon. The package is designed for easy opening and has an adhesive for adherence onto a substrate, such as a cereal box or a lid for a cup for a beverage, such as a soft drink.

2. Description of the Prior Art

Heretofore various packaging techniques have been proposed for carrying and displaying a compact disc. The simplest of these prior art packages or carriers is a package made up of two sheets of flexible, clear or translucent plastic material that are sealed together and cut along a square periphery and around a disc disposed between the two sheets. Typically, this is done by cutting and heat sealing the overlapping sheets in a generally square pattern.

In the manufacture of such a package, a first sheet is placed on a planar support surface followed by placing a compact disc on the first sheet, placing a second sheet over the disc and first sheet and then, with a dielectric or radio frequency welding die the package is formed by applying measured heat and pressure in a square pattern around the disc, thus sealing the disc between two square sheets of plastic material.

Numerous other packages or carriers comprising rigid plastic plates hinged together to form a small thin box have also been proposed. Still further, two recent packages or carriers for compact discs are disclosed in the following U.S. patents:

| U.S. Pat. No. | Patentee |
| --- | --- |
| 5,732,818 | Koehn |
| 6,016,908 | Gaetano |

SUMMARY OF THE INVENTION

According to the present invention there is provided a package or carrier for a compact disc, the package comprising a lower layer of flexible plastic material, a compact disc positioned on the lower layer and an upper layer sealed in two concentric circles to the lower layer, the inner circular seal surrounding a circular hole through the two layers and the outer circular seal extending in a circle around the periphery of the compact disc.

BRIEF DESCRIPTION OF THE DRAWINGS

FIG. 1 is a top plan view of one embodiment of a package assembly and a compact disc package or carrier in the package assembly constructed according to the teachings of the present invention.

FIG. 2 is a cross-sectional view of the package assembly containing the compact disc package shown in FIG. 1 and is taken along line 2—2 of FIG. 1.

DESCRIPTION OF THE PREFERRED EMBODIMENTS

Referring to the drawings in greater detail, there is illustrated in FIG. 1, a package assembly 8 from which a compact disc carrier or package 10 can be removed for being adhered to a substrate.

As best shown in FIG. 2, it will be noted that the package 10 of the present invention comprises a first or bottom layer 12 of flexible, clear, plastic material, a compact disc 14 positioned on the bottom layer 12 and a top layer 16 of flexible, clear, plastic material over the compact disc 14. Also as shown, an adhesive 18 is applied on a bottom surface 20 of the lower layer 12. Then, to facilitate shipping, a paper or plastic liner 22 is fixed to and beneath the adhesive 18.

The upper layer 16 is sealed to the lower layer 12 by a radio frequency die which applies heat and pressure in two concentric circles 23 and 24. The inner circle 23 defines a seal 23 around a circular hole 25 in the center of the package 10 which extends through the upper layer 16, the lower layer 12 and the adhesive 18. To create the seal 23, the die creates a depression 26 in the upper layer 16 in the central area of the package 10 and a cutting die crates the circular hole 25.

The outer larger circle 24 defines an outer seal 24 adjacent an outer edge 28 of the package 10 defined at a cut line 28 cut by a die. It will be understood that when the package 10 is formed, a concentric circle die is brought down over the upper layer 16 and heat seals and cuts a large outer circle indicated by the cut line 28 and at the same time a smaller circle die seals and cuts the center circular hole 25.

The die cuts through the upper layer 16, the lower layer 12 and the adhesive 18.

As best shown in FIG. 1, at the same time that the concentric circle die comes down on the two layers 16 and 12, the die also has two cross, cut knife blades, each of which make a so-called Kiss Cut in the upper layer 16 to form two perforated lines, score lines or cuts 38 and 40 in the upper layer 16 only.

The resulting circular package 10 can then be lifted off of the paper liner 22 and adhered by the adhesive 18 to a flat substrate, such as the outside of a cereal box or to a cover or lid for a beverage cup. The circular opening or hole 25 will allow a user to insert a straw through the hole into the beverage cup for drinking a beverage. In this way, the carrier or package 10 can be given away on the cover or lid for a soft drink cup at a fast food restaurant, such as McDonalds®.

The package 10 provides sufficient protection to the disc 14 therein and yet is easy openable by inserting a fingernail in the central depression 26 and engaging one of the four pie shaped quadrants 41–44 formed by the Kiss Cut perforation lines 38 and 40 and the outer periphery 28 in the package 10. The package 10 is intended to be non-reusable so that once one peels back one or more of the pie-shaped quadrants 41–44 and removes the disc 14, the package 10 and anything it is attached to can be discarded.

For ease in shipment, a plurality of square package assemblies 8, as shown in FIG. 1 and including scrap areas 51–54 located radially outwardly of the pie-shaped quadrants 41–44, can be shipped to a fast food restaurant or a cereal manufacturer or other business entity and then the package 10 can be pulled away from the package assembly 8 and adhered to a substrate by means of the adhesive 18.

The lower and upper layers 12 and 16 are preferably made of a clear synthetic plastic material, such as polyvinylchloride (PVC), polyurethane (PU), polyethylene (PE), polypropylene (PP) or polystyrene. The dielectric or radio frequency (RF) welding and cutting device is of the type which has been used for years to make air tight and waterproof seals for products, such as inflatable boats, water toys, protective garments, fishing waders, etc. The die, which is usually brass, is lowered onto a pattern which is supported by an underlying base plate and then a timed pulse of radio frequencies is delivered between the die and the base plate. The energy heats the plastic material between the die and base plate to temporarily melt the plastic, thereby fusing the two pattern pieces together, such as upper and lower layers 16 and 12. Once the layers 16 and 12 are fused and cut, the die is lifted and a new lower layer of plastic is moved into position, the CD is inserted on the lower layer, the upper layer is positioned over the lower layer and the cutting die is placed on top of this assembly and the process is repeated.

The cut or perforated cross cuts 38 and 40 are formed with a steel rule die by means of pressure which is used to form the so-called "Kiss Cut" which means that the material is not cut completely through the upper layer 161. In this way, scored or perforated lines 38 and 40 are formed with depressed material on either side of the cut lines 38 and 40, as shown in FIG. 1.

The adhesive 18 on the lower side 20 of the lower layer 12 enables the package 10 to be applied to any package, carton, container, lid or substrate. Typically, the adhesive is a soft acrylic adhesive which offers high initial tack when bonding low surface energy substrates, such as paper or board stock, while offering an excellent plasticizer migration resistance when bonding to flexible plastic containers or lids.

The package 10 permits an unobstructed view of the media disc fixed to the package which is fixed to a container or substrate. The perforated die cut lines 38 and 40 allow tamper resistance security in addition to protecting the disc from outside elements.

The adhesive liner 22 of the package assembly 8 allows the package 10 to be hand applied or applied in-line automatically without the need for spot gluing, die cutting, folding, tipping, insert molding, vacuum forming, injection molding, shrink wrapping, thermo-forming or taping.

The compact disc is typically a 3¼" disc referred to in the trade as a "Mini-Round". It is also referred to as a 185 megabyte, 8 centimeter round optical media disc, which typically holds up to 20 minutes of media content which can be about an upcoming movie, such as a Disney® movie, or about characters in a movie, such as a dinosaur. It will be understood that the media content can be anything one can imagine and can be in the form of a commercial, an advertisement or video instructions for putting together an assembly. These are just some examples of the possible uses of the "Mini-Round".

Also, it will be appreciated that the package or carrier 10 of the present invention can be used for packaging full sized compact discs, as opposed to the "Mini-Round".

The upper layer 16 is made from a flexible, clear plastic material having a thickness from 1 mil to 50 mil. The compact disc or CD is typically an 8 centimeter round optical media disc. The lower layer 12 is also made of a flexible, clear plastic material with a thickness of 1 mil to 10 mils. The acrylic adhesive 18 is laminated to the outer surface 20 of the lower layer 12 and is provided with a plastic or paper release liner 22.

The adhesive 18 is laminated in a thin layer of permanent or removable adhesive between the paper release liner 22 and the lower layer 12 of plastic material.

From the foregoing description, it will be appreciated that the package assembly 8 and the package 10 therein has a number of advantages, some of which have been described above and others which are inherent in the invention. In particular, it provides protection to a "Mini-Round" and provides viewing of the printed information on the "Mini-Round", easy fixing of the "Mini-Round" to a substrate, evidence of a tampered package and easy openability of the package to remove the "Mini-Round".

Also, it will be understood that modifications can be made to the package 10 of the present invention without departing from the teachings of the invention. Accordingly, the scope of the invention is only to be limited as necessitated by the accompanying claims.

I claim:

1. The combination of a package or carrier for a compact disc and a compact disc, said package comprising a lower layer of flexible plastic material, said compact disc being positioned on the lower layer and an upper layer sealed in two concentric circles to the lower layer, the inner circular seal surrounding a circular hole through said two layers and the outer circular seal extending in a circle around a periphery of said compact disc, an adhesive on an outer surface of the lower layer to facilitate fixing of the package to a substrate and a peel off liner fixed to the adhesive.

2. The combination of claim 1 wherein said compact disc is a "Mini-Round".

3. The package of claim 1 wherein said upper layer and said lower layer are made of a clear plastic material.

4. A package or carrier for a compact disc, said package comprising a lower layer of flexible plastic material which is adapted to receive thereon a compact disc and an upper layer sealed in two concentric circles to the lower layer, the inner circular seal surrounding a circular hole through said two layers and the outer circular seal extending in a circle around a periphery of the compact disc, at least two kiss cuts through the upper layer of the package extending across an upper surface of said package and intersecting in a central area of said package, and said kiss cuts being in the nature of a score or perforated line in said upper layer of said package to form four pie sections in said upper layer of said package which can peeled away to remove the compact disc.

5. The package assembly of claim 4 wherein an inner circular cut extends adjacent an inner circular seal through said upper layer, said lower layer and said adhesive to form said circular hole.

6. A package or carrier for a compact disc, said package comprising a lower layer of flexible plastic material which is adapted to receive thereon a compact disc and an upper layer sealed in two concentric circles to the lower layer, the inner circular seal surrounding a circular hole through said two layers and the outer circular seal extending in a circle around a periphery of the compact disc, an adhesive on an outer surface of the lower layer and a square bottom liner fixed to the adhesive which forms four scrap sections of upper layer, lower layer, adhesive and liner on each quadrant of the package assembly and which are located radially outwardly from said package.

7. A package or carrier for a compact disc, said package comprising a lower layer of flexible plastic material, said lower layer being adapted to receive a compact disc on said lower layer and an upper layer sealed in two concentric circles to the lower layer, the inner circular seal surrounding a circular hole through said two layers and the outer circular seal adapted to extend in a circle around a periphery of the compact disc, an adhesive on an outer surface of the lower layer to facilitate fixing of the package to a substrate and a peel off liner fixed to the adhesive.

8. The package of claim 7 being constructed and arranged to receive a "Mini-Round".

9. The package of claim 7 wherein said upper layer and said lower layer are made of a clear plastic material.

10. The package of claim 7 wherein said two concentric circle seals are heat seals.

11. The package of claim 7 wherein said two concentric circle seals are heat seals.

12. The combination of a package or carrier for a compact disc and a compact disc, said package comprising a lower layer of flexible plastic material, said compact disc being positioned on the lower layer and an upper layer sealed in two concentric circles to the lower layer, the inner circular seal surrounding an inner circular hole through said two layers and the outer circular seal extending in a circle around a periphery of said compact disc, an adhesive on an outer surface of the lower layer, a substrate and said package being fixed with said adhesive to said substrate.

13. The combination of claim 12 wherein said compact disc is a "Mini-Round".

14. The package of claim 12 wherein said substrate is a piece of paper.

15. The package of claim 12 wherein said substrate is a piece of plastic.

16. The package of claim 12 wherein said substrate is a side of a paperboard box.

17. The package of claim 12 wherein said substrate is a circular cover for a beverage cup and said inner circular hole is aligned with a straw receiving center hole in said cover.

18. The combination of claim 12 wherein said compact disc is a "Mini-Round".

19. The package of claim 12 wherein said upper layer and said lower layer are made of a clear plastic material.

20. A package or carrier for a compact disc, said package comprising a lower layer of flexible plastic material, said lower layer being adapted to receive a compact disc on said lower layer and an upper layer sealed in two concentric circles to the lower layer, the inner circular seal surrounding an inner circular hole through said two layers and the outer circular seal adapted to extend in a circle around a periphery of the compact disc, an adhesive on an outer surface of the lower layer, a substrate and said package being fixed with said adhesive to said substrate.

21. The package of claim 20 wherein said substrate is a piece of paper.

22. The package of claim 20 wherein said substrate is a piece of plastic.

23. The package of claim 20 wherein said substrate is a side of a paperboard box.

24. The package of claim 20 wherein said substrate is a circular cover for a beverage cup and said inner circular hole is aligned with a straw receiving center hole in said cover.

25. The package of claim 20 being constructed and arranged to receive a "Mini-Round".

26. The package of claim 20 wherein said upper layer and said lower layer are made of a clear plastic material.

27. The package of claim 20 wherein said two concentric circle seals are heat seals.

* * * * *